(12) United States Patent
Sellergren et al.

(10) Patent No.: US 11,519,469 B2
(45) Date of Patent: Dec. 6, 2022

(54) SINGLE BODY SLIDING BRAKE CALIPER ASSEMBLY

(71) Applicant: Volvo Car Corporation, Gothenburg (SE)

(72) Inventors: Mikael Sellergren, Gothenburg (SE); Quintus Jalkler, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 332 days.

(21) Appl. No.: 16/829,217

(22) Filed: Mar. 25, 2020

(65) Prior Publication Data
US 2021/0301891 A1 Sep. 30, 2021

(51) Int. Cl.
*F16D 55/226* (2006.01)
*F16D 65/00* (2006.01)
*F16D 55/2265* (2006.01)

(52) U.S. Cl.
CPC ..... *F16D 65/0068* (2013.01); *F16D 55/2265* (2013.01)

(58) Field of Classification Search
CPC ............... F16D 65/095; F16D 65/0062; F16D 65/0068; F16D 55/226; F16D 55/228; F16D 55/2265
USPC .......................................... 188/73.31, 73.39
See application file for complete search history.

(56) References Cited

U.S. PATENT DOCUMENTS

| | | | |
|---|---|---|---|
| 3,705,641 A * | 12/1972 | Brooks | F16D 55/32 188/73.31 |
| 4,197,926 A | 4/1980 | Youngdale | |
| 4,537,290 A * | 8/1985 | Evans | F16D 65/095 188/73.31 |
| 8,485,323 B2 | 7/2013 | Narayanan | |
| 8,905,200 B2 | 12/2014 | Gutelius | |
| 9,328,784 B2 * | 5/2016 | Badino | F16D 55/227 |
| 10,260,579 B2 * | 4/2019 | Magni | F16D 55/2265 |
| 2004/0188188 A1 | 9/2004 | Barbosa et al. | |
| 2005/0230197 A1 | 10/2005 | Jedele | |
| 2006/0289253 A1 * | 12/2006 | DeMorais | F16D 65/095 188/73.1 |

FOREIGN PATENT DOCUMENTS

| | | | | |
|---|---|---|---|---|
| DE | 10033834 A1 * | 6/2001 | ...... | F16D 55/226 |
| WO | WO-2015101866 A1 * | 7/2015 | ...... | F16D 55/22 |

* cited by examiner

*Primary Examiner* — Christopher P Schwartz
(74) *Attorney, Agent, or Firm* — Clements Bernard Walker; Christopher L. Bernard

(57) ABSTRACT

A brake system for a vehicle is disclosed. The brake system includes a wheel hub, a brake disk, and a brake caliper. The wheel hub includes a hub and attachment posts. The hub defines a bore adapted to receive an axle of the vehicle. The attachment posts extend away from the hub adjacent to the bore. The attachment posts are singularly and integrally formed with the hub. The brake disk is disposed adjacent the wheel hub. The brake caliper includes a piston housing and a body. The piston housing is adapted to hold a piston. The piston housing defines mounting holes used to movably mount the brake caliper directly to the wheel hub at the attachment posts. The body is positioned radially outward of the brake disk. The piston housing and the body are integrally formed as a singular component.

16 Claims, 5 Drawing Sheets

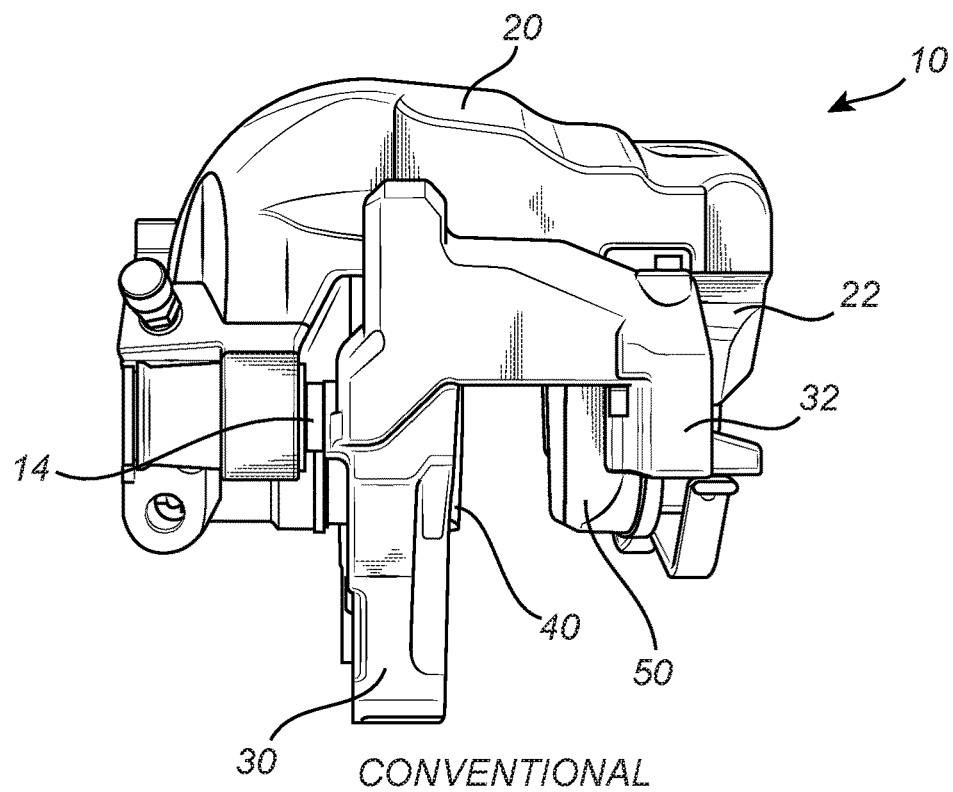
CONVENTIONAL
Fig. 1
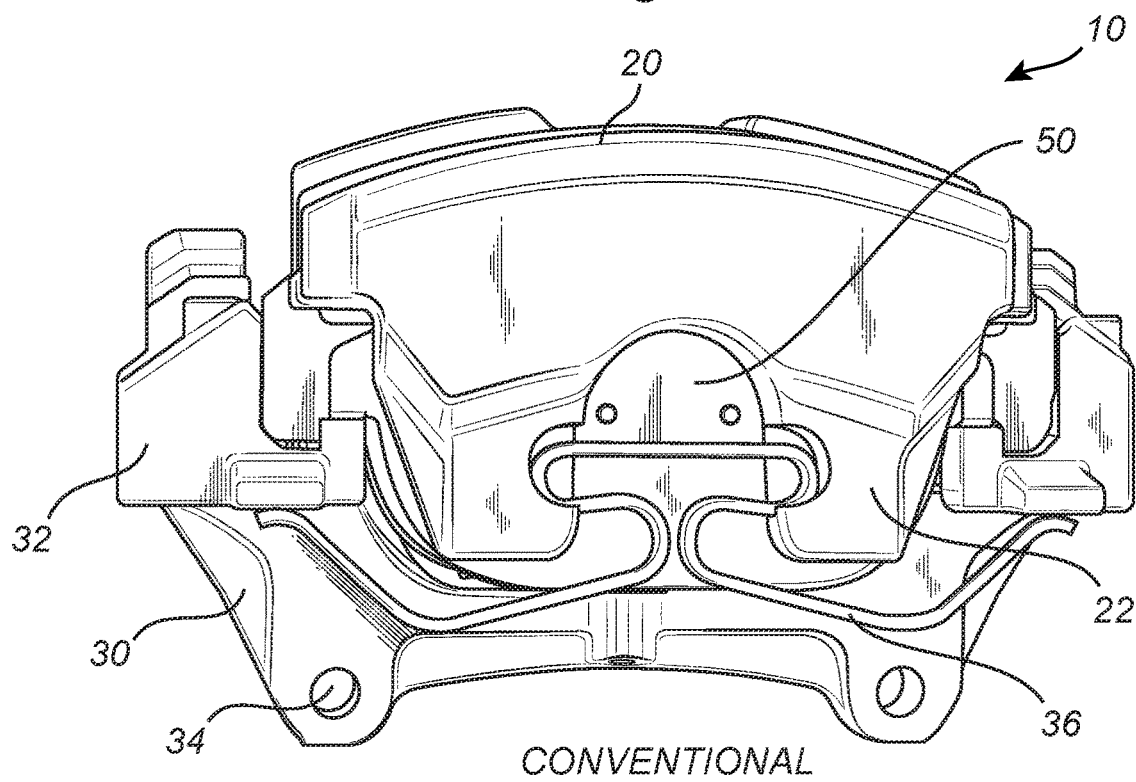
CONVENTIONAL
Fig. 2

SINGLE BODY SLIDING BRAKE CALIPER ASSEMBLY

TECHNICAL FIELD

The present disclosure relates generally to the automotive field. More particularly, the present disclosure relates to a brake system for a vehicle that includes an integrally formed, single body sliding brake caliper assembly that mounts directly to the associated wheel hub via attachment posts that are integrally formed with the wheel hub.

BACKGROUND

Conventional vehicle brake systems incorporate a significant number of interconnected parts that are assembled to the wheel hub of a wheel assembly. Specifically, a conventional caliper assembly includes a caliper housing and a caliper anchor bracket that are configured to hold and guide an inner brake pad and an outer brake pad into contact with the associated brake disk to apply a braking force to a wheel of the vehicle and the vehicle itself. The caliper anchor bracket defines bracket mounting holes that are used to mount the caliper assembly to the associated wheel hub of the wheel assembly, and in particular, to a knuckle of the wheel hub, using mounting bolts. The caliper anchor bracket also includes a bracket arm that extends around an outer portion of the brake disk. The bracket arm supports the outer brake pad at a bottom portion thereof. The caliper anchor bracket similarly supports the inner brake pad.

In a conventional caliper assembly, the caliper housing does not mount directly to the wheel hub of the wheel assembly, but rather mounts to the caliper anchor bracket via slider pins. The slider pins have a shank long enough to permit the caliper housing to move, such as by sliding along the shank, relative to the caliper anchor bracket and the wheel hub. While the caliper anchor bracket supports the outer brake pad, the caliper housing still moves the outer brake pad relative to the caliper anchor bracket and relative to the brake disk of the brake system via the caliper arm that extends over and around a back of the outer brake pad. In particular, when brake fluid is supplied to the hydraulic cylinder of the caliper housing, the piston presses the inner brake pad into contact with an inner surface of the brake disk. As the pressure builds, the hydraulic cylinder of the caliper housing is pushed away from the brake disk, which moves the caliper such that the caliper arm pulls the outer brake pad into contact with an outer surface of the brake disk, while moving the outer brake pad relative to the bracket arm of the caliper anchor bracket.

During assembly/disassembly of the caliper assembly, the caliper anchor bracket has to be bolted to/unbolted from the knuckle of the wheel hub, the slider pin has to be engaged/disengaged to secure/unsecure the caliper housing to/from the caliper anchor bracket, and an anti-rattle spring has to be installed/uninstalled. Each of these steps requires the use of different tools and has different installation requirements. For example, the recommended torque for properly securing the slider pins to the caliper anchor bracket is different than the recommended torque for properly securing the bolts to the knuckle of the wheel hub. Further, while the inner brake pad may be held relative to the caliper housing via a spring during the installation of the caliper housing onto the caliper anchor bracket, the outer brake pad is loosely supported by the bracket arm and must be held in place as the caliper housing is positioned over the brake disk, around the outer brake pad, and relative to the caliper anchor bracket and secured to the caliper anchor bracket. These complexities increase the time for assembly and disassembly of the brake system, and in particular, the caliper assembly.

The above-described background relating to brake systems and caliper assemblies for vehicles is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides a single body sliding brake caliper assembly that is largely integrally formed as a singular component, rather than an assembly of multiple components that are coupled together. The single body sliding brake caliper assembly mounts directly to the wheel hub via attachment posts that are integrally formed with the wheel hub via slider pins, rather than via an assembly of multiple components that are coupled together. The single body sliding brake caliper assembly also directly supports and holds the inner brake pad and the outer brake pad.

Thus, assembly of the brake system is simplified, as the inner brake pad and the outer brake pad are located in their respective positions in the single body sliding brake caliper assembly and the single body sliding brake caliper assembly is secured to the wheel hub with the inner brake pad and the outer brake pad, over a radial edge of the brake disk, via the slider pins. Furthermore, due to the integral nature of the single body sliding brake caliper assembly and the wheel hub, stiffness of the brake system is improved, and noise produced by the brake system during operation of the vehicle is reduced.

In one exemplary embodiment, the present disclosure provides a brake caliper for a braking system of a vehicle. The brake caliper includes a piston housing, an outer support bracket, and a body. The piston housing is adapted to hold a piston. The piston housing defines one or more mounting holes adapted to movably mount the brake caliper directly to a wheel hub. The outer support bracket is spaced apart from the piston housing and is adapted to directly support an outer brake pad on an opposite side of a brake disk of the braking system from the piston housing. The body connects the outer support bracket to the piston housing. The body is adapted to be positioned radially outward of the brake disk when the brake caliper is mounted to the wheel hub. The piston housing, the outer support bracket, and the body are integrally formed as a singular component.

In one embodiment of the brake caliper, the one or more mounting holes are each adapted to receive a slider pin for movably mounting the brake caliper directly to the wheel hub and for guiding movement of the brake caliper, including the outer support bracket, relative to the wheel hub in an axial direction of the piston. In another embodiment of the brake caliper, the outer support bracket defines a slot adapted to receive a portion of the outer brake pad to hold the outer brake pad fixed relative to the brake caliper in an axial direction of the piston. Optionally, the outer support bracket includes outer supporting pads positioned at opposite ends of the outer support bracket and adapted to support ends of the outer brake pad opposite the slot. The outer supporting pads are integrally formed as part of the singular component. In a further embodiment of the brake caliper, the outer support bracket includes outer supporting pads positioned at opposite ends of the outer support bracket and adapted to support ends of the outer brake pad opposite the body. The outer supporting pads are integrally formed as part of the singular component. Optionally, the outer supporting pads each comprise an outer ridge protruding towards the body and adapted to receive a notch in the outer brake pad. The outer ridge of each of the outer supporting pads are integrally formed as part of the singular component.

In another exemplary embodiment, the present disclosure provides a wheel hub for a vehicle. The wheel hub includes a hub and attachment posts. The hub defines a bore adapted to receive an axle of the vehicle. The attachment posts extend away from the hub adjacent to the bore. Three attachment posts are adapted to directly and movably mount an integrally formed brake caliper that includes a piston housing adapted to hold a piston and includes a body adapted to be positioned radially outward of a brake disk of a brake assembly while mounted to the wheel hub. The hub and the attachment posts are integrally formed as a singular component.

In one embodiment of the wheel hub, the attachment posts each taper from a base adjacent the hub to an end distal from the hub, the end being narrower than the base. In another embodiment of the wheel hub, each of the attachment posts is adapted to receive a slider pin for directly and movably mounting the brake caliper to the wheel hub and for guiding movement of the brake caliper relative to the wheel hub in an axial direction of a piston of the brake assembly. In a further embodiment of the wheel hub, the attachment posts extend orthogonal to an axial direction of the bore.

In a further exemplary embodiment, the present disclosure provides a brake system for a vehicle. The brake system includes a wheel hub, a brake disk, and a brake caliper. The wheel hub includes a hub and attachment posts. The hub defines a bore adapted to receive an axle of the vehicle. The attachment posts extend away from the hub adjacent to the bore. The attachment posts are singularly and integrally formed with the hub. The brake disk disposed adjacent the wheel hub. The brake caliper includes a piston housing and a body. The piston housing is adapted to hold a piston. The piston housing defines mounting holes used to movably mount the brake caliper directly to the wheel hub at the attachment posts. The body is positioned radially outward of the brake disk. The piston housing and the body are integrally formed as a singular component.

In one embodiment of the brake system, the brake system also includes slider pins movably mounting the brake caliper to the wheel hub via the mounting holes of the piston housing and corresponding holes defined by the attachment posts. Optionally, the slider pins guide movement of the brake caliper relative to the wheel hub in an axial direction of the piston of the brake assembly. In another embodiment of the brake system, the attachment posts each taper from a base adjacent the hub to an end distal to the hub, the end being narrower than the base. In a further embodiment of the brake system, the attachment posts extend orthogonal to an axial direction of the bore. In a still further embodiment of the brake system, the brake caliper also includes an outer support bracket. The outer support bracket is spaced apart from the piston housing on an opposite side of the brake disk from the piston housing. The outer support bracket is integrally formed as part of the singular component. The brake system further includes an outer brake pad and an inner brake pad. The outer brake pad is held directly by the outer support bracket adjacent to the brake disk. Optionally, the outer support bracket includes a slot with a portion of the outer brake pad received therein to hold the outer brake pad fixed relative to the brake caliper in an axial direction of the piston. Optionally, the outer support bracket includes outer supporting pads positioned at opposite ends of the outer support bracket. The outer supporting pads support ends of the outer brake pad opposite the slot. The outer supporting pads are integrally formed as part of the singular component. Optionally, the outer support bracket includes outer supporting pads positioned at opposite ends of the outer support bracket that support ends of the outer brake pad opposite the body. The outer supporting pads are integrally formed as part of the singular component. Optionally, the outer supporting pads each comprise an outer ridge protruding towards the body that receive a notch in the outer brake pad. The outer ridge of each of the outer supporting pads are integrally formed as part of the singular component.

BRIEF DESCRIPTION OF THE DRAWINGS

The present disclosure is illustrated and described herein with reference to the various drawings, in which like reference numbers are used to denote like assembly components/method steps, as appropriate, and in which:

FIG. 1 is a front perspective view of a conventional brake caliper assembly adapted to hold an inner brake pad and an outerr brake pad of a conventional brake system;

FIG. 2 is a side perspective view of the conventional brake caliper assembly of FIG. 1 adapted to hold the inner brake pad and the outer brake pad of the conventional brake system;

DESCRIPTION OF EXEMPLARY EMBODIMENTS

Figure 3:
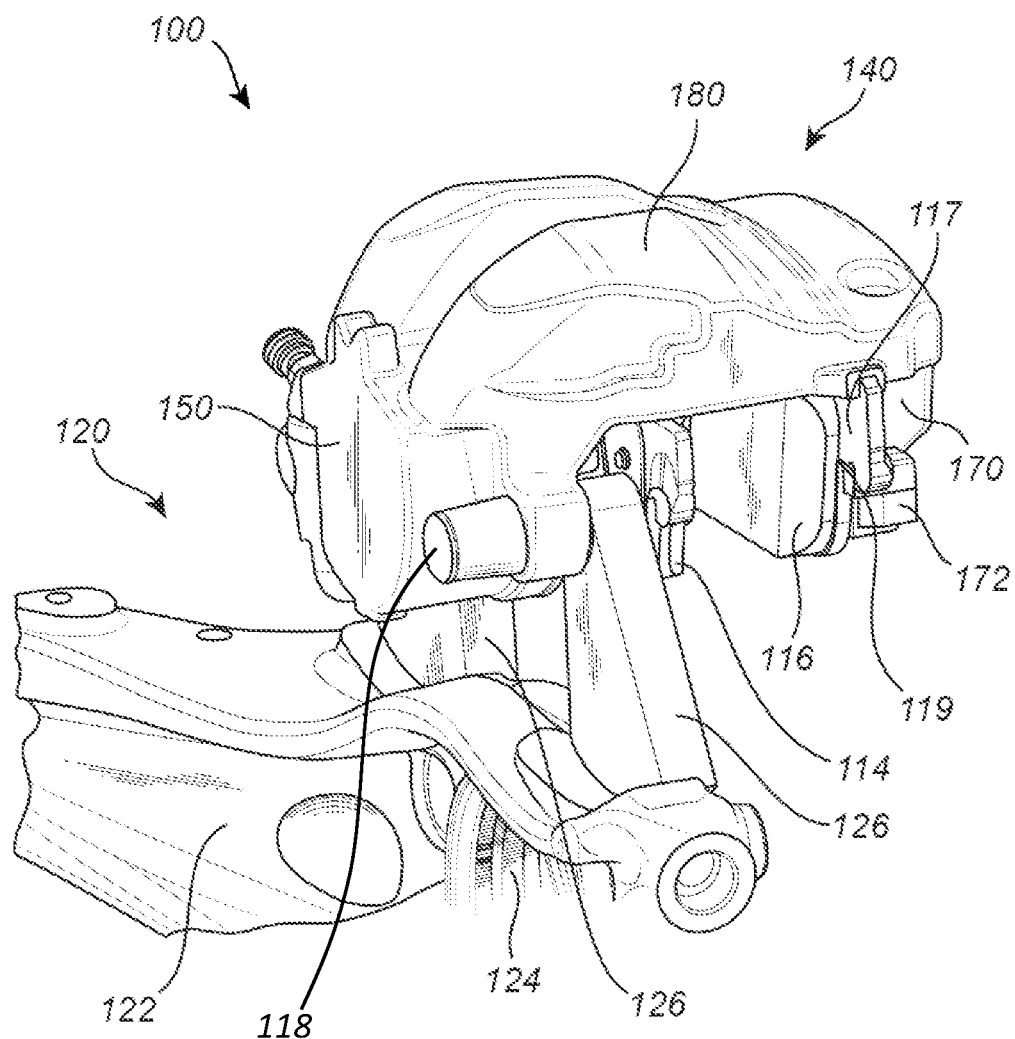
FIG. 3 is a perspective view of an exemplary embodiment of a brake system including an integrally formed, single body sliding brake caliper assembly that mounts directly to a wheel hub via attachment posts that are integrally formed with the wheel hub.

Again, conventional vehicle brake systems incorporate a significant number of interconnected parts. For example, FIG. 1 is a front perspective view of a conventional caliper assembly 10 adapted to hold an inner brake pad 40 and an outer brake pad 50 of a conventional brake system, and FIG. 2 is a side perspective view of the same conventional caliper assembly 10 adapted to hold the inner brake pad 40 and the outer brake pad 50 of the conventional brake system. As can be seen in FIGS. 1 and 2, the conventional caliper assembly 10 incorporates a significant number of components and multiple connections between those components when assembled to the wheel hub of a wheel assembly.

Specifically, the conventional caliper assembly 10 includes a caliper housing 20 and a caliper anchor bracket 30 that are configured to hold and guide the inner brake pad 40 and the outer brake pad 50 into contact with the associated brake disk to apply a braking force to a wheel of the vehicle and the vehicle itself. The caliper anchor bracket 30 defines bracket mounting holes 34 that are used to mount the caliper assembly 10 to the associated wheel hub of the wheel assembly, and in particular, to a knuckle of the wheel hub, using mounting bolts. The caliper anchor bracket 30 also includes a bracket arm 22 that extends around an outer portion of the brake disk. The bracket arm 22 supports the outer brake pad 50 at a bottom portion thereof, such as at the bottom of the sides of the outer brake pad. The sides can be ears of the outer brake pad 50. The caliper anchor bracket 30 can similarly support the inner brake pad 40.

In a conventional caliper assembly 10, the caliper housing 20 does not mount directly to the wheel hub of the wheel assembly, but rather mounts to the caliper anchor bracket 30 via slider pins 14. The slider pins 14 couple the caliper housing 20 to the caliper anchor bracket 30. The slider pins 14 have a shank long enough to permit the caliper housing 20 to move, such as by sliding along the shank, relative to the caliper anchor bracket 30 and the wheel hub. While the caliper anchor bracket 30 supports the outer brake pad 50, the caliper housing 20 still moves the outer brake pad 50 relative to the caliper anchor bracket 30 and relative to the brake disk of the brake system via the caliper arm 22 that extends over and around a back of the outer brake pad 50. In particular, when brake fluid is supplied to the hydraulic cylinder of the caliper housing 20, the piston presses the inner brake pad 40 into contact with an inner surface of the brake disk. As the pressure builds, the hydraulic cylinder of the caliper housing 20 is pushed away from the brake disk, which moves the caliper 20 such that the caliper arm 22 pulls the outer brake pad 50 into contact with an outer surface of the brake disk, while moving the outer brake pad 50 relative to the bracket arm 32 of the caliper anchor bracket 30.

The caliper assembly 10 also optionally includes an anti-rattle spring 36 that is secured to the bracket arm 32 of the caliper anchor bracket 30, hooks into slots of the caliper arm 22, and presses against a back of the outer brake pad 50.

During assembly/disassembly of the caliper assembly 10, the caliper anchor bracket 30 has to be bolted to/unbolted from the knuckle of the wheel hub, the slider pin has to be engaged/disengaged to secure/unsecure the caliper housing 20 to/from the caliper anchor bracket 30, and the anti-rattle spring 36 has to be installed/uninstalled. Each of these steps requires the use of different tools and has different installation requirements. For example, the recommended torque for properly securing the slider pins 14 to the caliper anchor bracket 30 is different than the recommended torque for properly securing the bolts to the knuckle of the wheel hub.

Further, while the inner brake pad 40 may be held relative to the caliper housing 20 via a spring during the installation of the caliper housing 20 onto the caliper anchor bracket 30, the outer brake pad 50 is loosely supported by the bracket arm 32 and must be held in place as the caliper housing 20 is positioned over the brake disk, around the outer brake pad 50, and relative to the caliper anchor bracket 30 and secured to the caliper anchor bracket 30. These complexities increase the time for assembly and disassembly of the brake system, and in particular, the caliper assembly 10.

Thus, the present disclosure generally provides a single body sliding brake caliper or caliper assembly that is integrally formed as a singular component, rather than collection of multiple components that are coupled together. The single body sliding brake caliper mounts directly to the associated wheel hub at attachment posts that are integrally formed with the wheel hub via slider pins or the like. The single body sliding brake caliper also directly supports and holds the associated inner brake pad and outer brake pad.

As both the brake caliper and the wheel hub are each integrally formed components, the overall number of components and fasteners of the brake system is reduced from conventional brake systems, which simplifies the assembly of the brake system. In particular, assembly of the brake system includes locating the inner brake pad and the outer brake pad in their respective positions in the caliper housing, positioning the brake caliper relative to the wheel hub, and securing the brake caliper to the wheel hub via the slider pins or the like. Along with reducing the complexity of the brake system and simplifying the assembly and disassembly processes for the brake system, and due to the integral nature of the brake caliper and the wheel hub of the brake system, the stiffness of the brake system is improved and noise caused by the brake system during operation of the vehicle is reduced.

Figure 4:
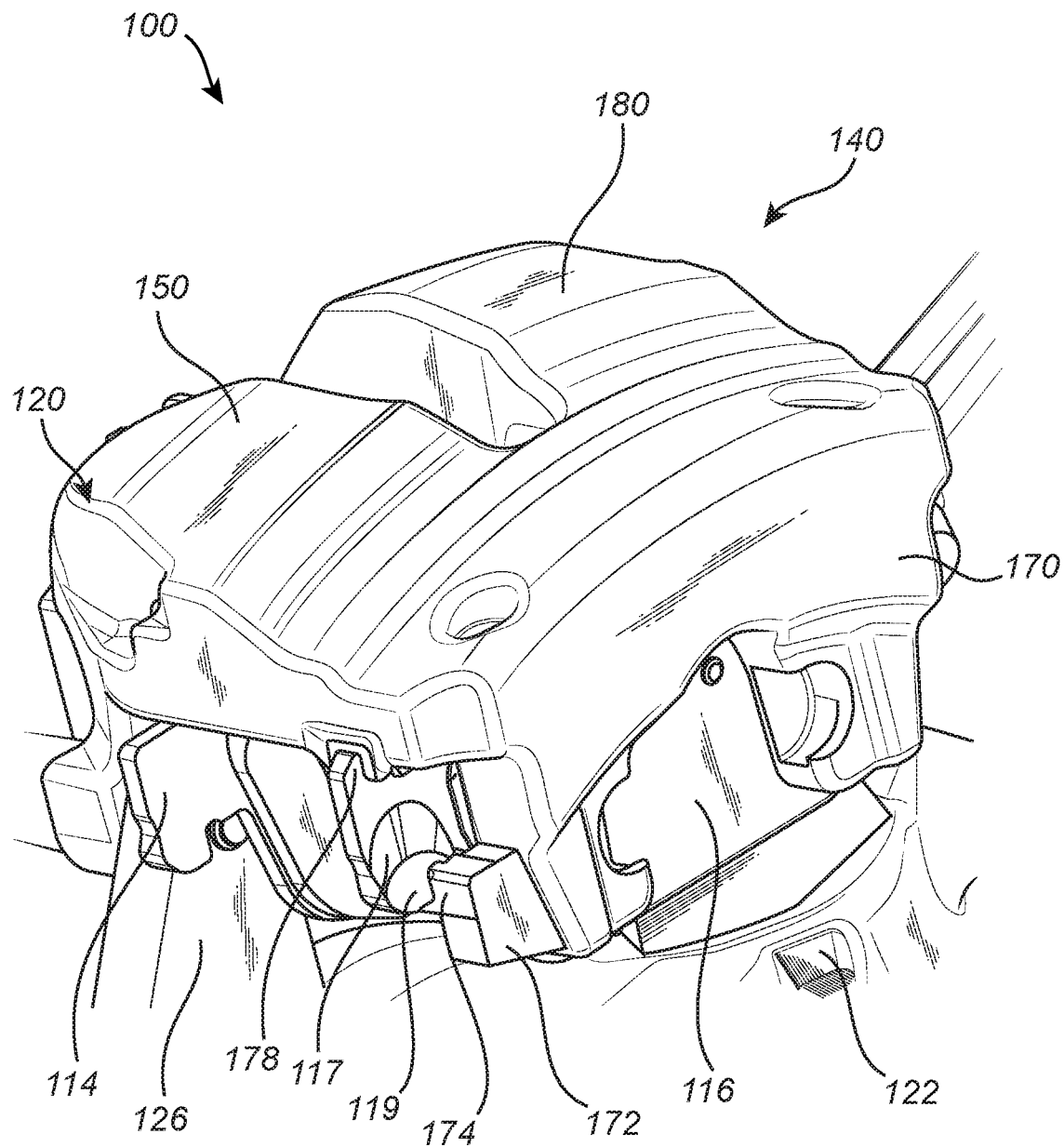
FIG. 4 is an alternate perspective view of the brake system of FIG. 3.
Figure 5:
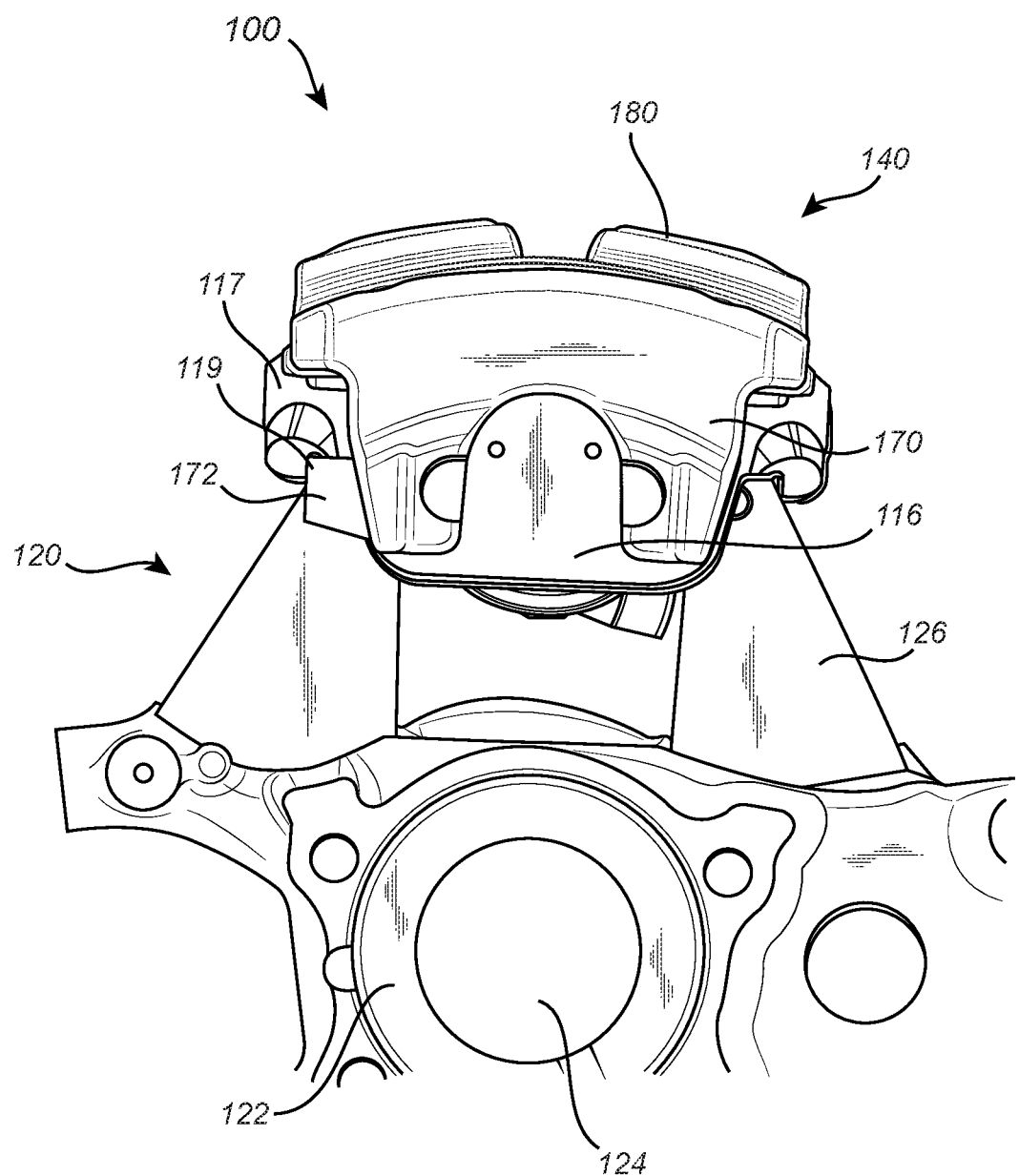
FIG. 5 is a side perspective view of the brake system of FIG. 3.
Figure 6:
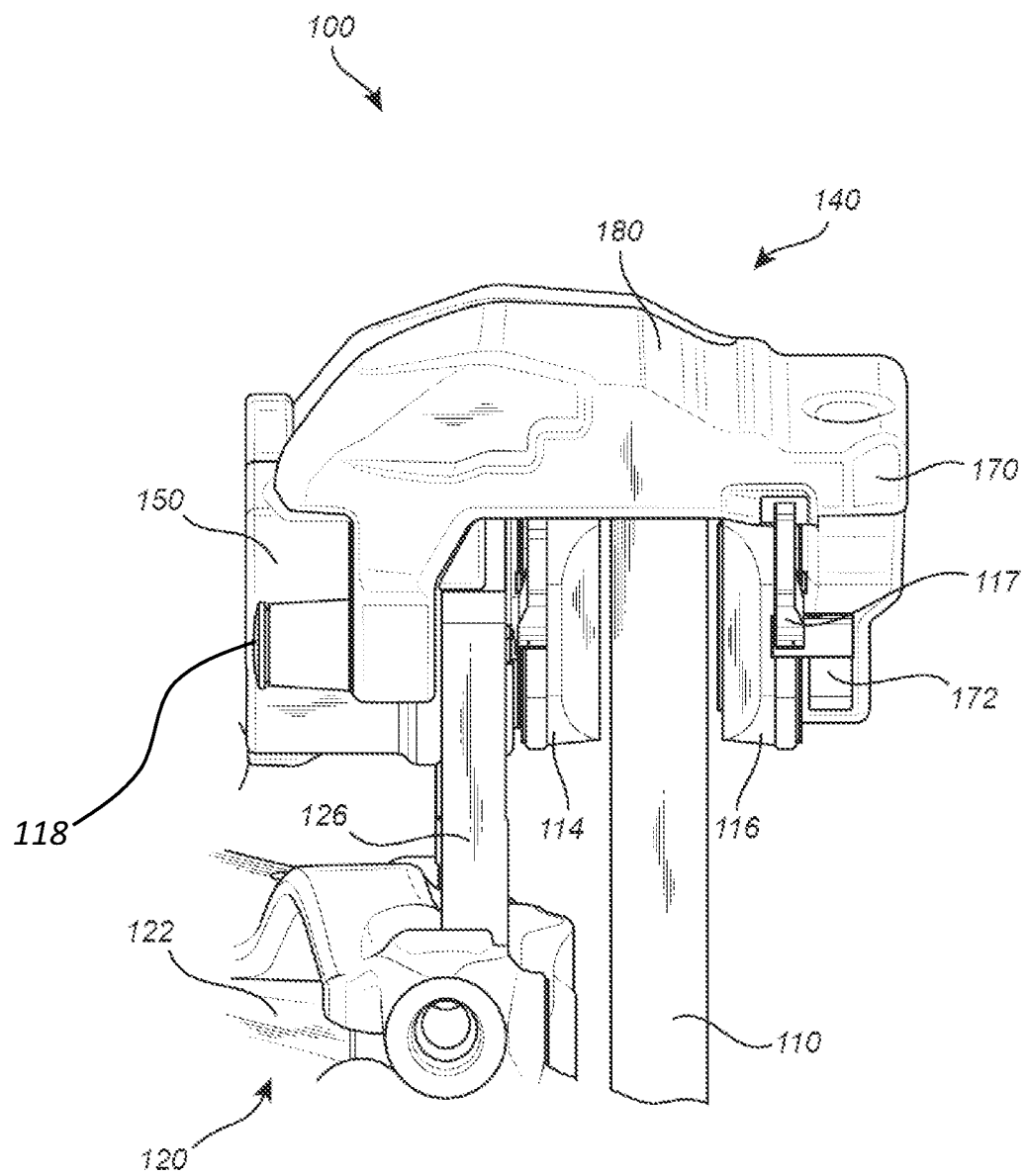
FIG. 6 is a front perspective view of the brake system of FIG. 3, including a brake disk.

FIG. 3 is a perspective view of an exemplary embodiment of a brake system 100 including an integrally formed, single body sliding brake caliper 140 that mounts directly to an associated wheel hub 120 at attachment posts 126 that are integrally formed with a hub 122 of the wheel hub 120. FIG. 4 is an alternate perspective view of the brake system 100 of FIG. 3. FIG. 5 is a side perspective view of the brake system 100 of FIG. 3. FIG. 6 is a front perspective view of the brake system 100 of FIG. 3, including a brake disk 110.

Referring to FIGS. 3-6, in one exemplary embodiment of the brake system 100, the brake system 100 includes a brake disk 110 (refer to FIG. 6), an inner brake pad 114, an outer brake pad 116, a wheel hub 120, a brake caliper 140, and one or more slider pins 118.

The wheel hub 120 includes a hub 122 and attachment posts 126. The hub 122 and the attachment posts 126 are formed in a common casting rather than being separately cast components that are later joined together. Thus, the attachment posts 126 are singularly and integrally formed with the hub 122. The hub 122 defines a bore 124 that is adapted to receive an axle of the vehicle.

The attachment posts 126 extend away from the hub 122 adjacent to the bore 124. The attachment posts 126 are adapted to directly and movably mount the brake caliper 140 to the wheel hub 120 with a body 180 of the brake caliper 140 adapted to be positioned radially outward of a brake disk 110. Each of the attachment posts 126 is adapted to receive a slider pin 118 for directly and movably mounting the brake caliper 140 to the wheel hub 120 and for guiding movement of the brake caliper 140 relative to the wheel hub 120 in an axial direction of a piston of the brake assembly 100. The axial direction of the piston of the brake assembly 100 is the same direction as the axial direction of the bore 124 of the wheel hub 120. Each of the attachment posts 126 defines holes for receiving a slider pin 118, and in particular, defines an internally-threaded hole for receiving an externally-threaded end of a slider pin 118.

As can be seen in FIGS. 3 and 5, in some embodiments, the attachment posts 126 each taper from a base adjacent the hub 122 to an end distal from the hub 122, the end being narrower than the base. In these embodiments, the holes defined by the attachment posts 126 are positioned at the narrower end of the attachment posts 126. Optionally, as can be seen in FIG. 5, the attachment posts 126 extend orthogonal to an axial direction of the bore 124.

As can be seen in FIG. 6, the brake disk 110 is disposed adjacent the wheel hub 120. The brake disk 110 is positioned on the axle of the vehicle and is coaxial to the hole 124 of the hub 122.

The brake caliper 140 includes a piston housing 150, an outer support bracket 170, and a body 180. The piston housing 150, the outer support bracket 170, and the body 180 are formed in a common casting rather than being separately cast components that are later joined together. Thus, the piston housing 150, the outer support bracket 170, and the body 180 are integrally formed as a singular component.

The piston housing 150 is adapted to hold a piston. In particular, the piston housing 150 forms a cylinder the receives the piston. The cylinder is also adapted to receive brake fluid, which increases hydraulic pressure within the cylinder to move the piston.

The piston housing 150 also defines one or more mounting holes adapted to movably mount the brake caliper 140 directly to the wheel hub 120. In particular, the one or more mounting holes are each adapted to receive a slider pin 118 for movably mounting the brake caliper 140 directly to the wheel hub 230 and for guiding movement of the brake caliper 140, including the outer support bracket 170, relative to the wheel hub 120 in an axial direction of the piston. The one or more mounting holes are each through holes that receive a slider pin 118. Each of the one or more mounting holes are also adapted to receive bushings that facilitate movement of a shank of a slider pin 118 through the corresponding mounting hole during operation of the brake system 100.

The outer support bracket 170 is spaced apart from the piston housing 140 and is adapted to directly support the outer brake pad 116 on an opposite side of the brake disk 110 of the braking system 100 from the piston housing 140.

In embodiments, the outer support bracket 170 defines a slot 178 that is adapted to receive a portion of the outer brake pad 116 to hold the outer brake pad 116 fixed relative to the brake caliper 140 in an axial direction of the piston. The slot 178 is positioned at an inner surface of the brake caliper 140 that is facing towards the axle. The slot 178 receives a top edge of the outer brake pad 116 that extends between each end 117 of the outer brake pad 116. The slot 178 is also adjacent to the body 180.

In embodiments, the outer support bracket 170 includes outer supporting pads 172 positioned at opposite ends of the outer support bracket 170 and adapted to support the ends 117 of the outer brake pad 116 opposite the slot 178. A contact surface of the outer supporting pads 172 faces towards the slot, the contact surface being the surface that directly contacts the outer brake pad 116. Relative to the axle, the outer supporting pads 172 of the outer support bracket 170 are positioned radially inward from the slot 178, such that the outer brake pad 116 is held between the slot 178 and the outer supporting pads 172 when the outer brake pad 116 is installed in the brake caliper 140. The outer supporting pads 172 are cast with the other features of the brake caliper 140. Thus, the outer supporting pads 172 are also integrally formed as part of the singular component that defines the brake caliper 140.

Optionally, the outer supporting pads 172 each include an outer ridge 174 protruding towards the body 180 and adapted to receive a notch 119 in the outer brake pad 116. The outer ridge 174 also protrudes towards the slot 178. The notch 119 is positioned in each end of the outer brake pad 116 at a bottom of the outer brake pad 116 opposite the top edge of the outer brake pad 116 received in the slot 178. The outer ridge 174 of each outer supporting pad 172 is also cast with the other features of the brake caliper 140. Thus, the outer ridge 174 of each of the outer supporting pads 172 is integrally formed as part of the singular component that defines the brake caliper 140.

In some embodiments, the brake caliper 140 further includes an inner support bracket adjacent to the piston housing 140 and spaced apart from the outer support bracket 170. The inner support bracket is adapted to directly support the inner brake pad 114 on an opposite side of the brake disk 110 of the braking system 100 from the outer support bracket 170.

Optionally, the inner support bracket includes inner supporting pads positioned at opposite ends of the inner support bracket and adapted to support ends of the inner brake pad 114. A contact surface of the inner supporting pads faces towards the body 180, the contact surface being the surface that directly contacts the inner brake pad. Relative to the axle, the inner supporting pads of the inner support bracket are positioned radially inward from the body 180. The inner supporting pads are cast with the other features of the brake caliper 140. Thus, the inner supporting pads are also integrally formed as part of the singular component that defines the brake caliper 140. The inner supporting pads are situated similarly to the outer supporting pads 172.

Optionally, the inner supporting pads each include an inner ridge protruding towards the body 180 and adapted to receive a notch in the inner brake pad. A notch of the inner brake pad is positioned in each end of the inner brake pad at a bottom of the inner brake pad. The inner ridge of each inner supporting pads is also cast with the other features of the brake caliper 140. Thus, the inner ridge of each of the inner supporting pads is integrally formed as part of the singular component that defines the brake caliper 140.

In some embodiments, the outer support bracket 170 defines spring slots that are adapted to receive a spring.

As discussed above, the brake caliper 140 and the features thereof are integrally formed as a singular component, and the attachment posts 126 of the wheel hub 120 are integrally formed with the hub 122 of the wheel hub 120. The brake caliper 140 mounts directly to the attachment posts 126 via the slider pins 118, and both the inner brake pad 114 and the outer brake pad 116 are supported by the brake caliper 140. Thus, assembly of the brake system 100 is simplified by reducing the number of components in the assembly, completely eliminating the need for fastening bolts, and by facilitating insertion of the inner brake pad 114 and the outer brake pad 116 into the brake caliper 140 before the brake caliper 140 is mounted to the wheel hub 120.

In operation, when the cylinder receives brake fluid, the piston presses the inner brake pad 114 against the brake disk 110. As the pressure increases, the force applied against the inner brake pad 114 from the brake disk 110 pushes the piston housing 150 away from the brake disk 110. The piston housing 150, along with all of the other features of the brake caliper 140 including the body 180 and the outer support bracket 170, moves relative to the wheel hub along the slider pins 118. Further, the outer brake pad 116 moves in concert with the outer support bracket 170 and with the outer supporting pads 172.

Due to integral natures of the brake caliper 140 and the wheel hub 120 within the brake system 100, the stiffness of the brake system 100 is optimized. In particular, the height of the piston housing 150 is set based on the relative positions of the through holes of the piston housing 150. While the attachment posts 126 are elongated so that the brake caliper 140 is properly positioned over a radially outer edge of the brake disk 110, the width of the attachment posts 126 is set to optimize the stiffness of the brake system 100. In particular, the attachment posts 126 each taper from the base of the attachment posts 126 adjacent the hub 122 to the end of the attachments posts 126 distal from the hub 122 with the end of the attachment posts 126 being narrower than the base of the attachment posts 126. Along with other features of the brake system 100, the taper of the attachment posts 126 defines the stiffness of the brake system 100.

By optimizing the stiffness of the brake system 100, reducing the number of components of the brake system 100, and eliminating fasteners and connections within the brake system 100, noise caused by the brake system 100, such as from vibration of the brake system 100, is reduced during operation of the vehicle.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A brake caliper, comprising:
a piston housing adapted to hold a piston, the piston housing defining a mounting hole adapted to movably mount the brake caliper directly to a wheel hub;
an outer support bracket spaced apart from the piston housing and adapted to directly support an outer brake pad on an opposite side of a brake disk of a braking system from the piston housing; and
a body connecting the outer support bracket to the piston housing, the body adapted to be positioned radially outward of the brake disk when the brake caliper is mounted to the wheel hub,
wherein the piston housing, the outer support bracket, and the body are integrally formed as a singular component, and
wherein the outer support bracket includes outer supporting pads positioned at opposite ends of the outer support bracket and adapted to support ends of the outer brake pad opposite the body, the outer supporting pads being integrally formed as part of the singular component.

2. The brake caliper of claim 1, wherein the mounting hole is adapted to receive a slider pin for movably mounting the brake caliper directly to the wheel hub and for guiding movement of the brake caliper, including the outer support bracket, relative to the wheel hub in an axial direction of the piston.

3. The brake caliper of claim 1, wherein the outer support bracket defines a slot adapted to receive a portion of the outer brake pad to hold the outer brake pad fixed relative to the brake caliper in an axial direction of the piston.

4. The brake caliper of claim 3, wherein the outer support bracket includes the outer supporting pads positioned at opposite ends of the outer support bracket and adapted to support ends of the outer brake pad opposite the slot, the outer supporting pads being integrally formed as part of the singular component.

5. The brake caliper of claim 1, wherein the outer supporting pads each comprise an outer ridge protruding towards the body and adapted to receive a notch in the outer brake pad, and the outer ridge of each of the outer supporting pads are integrally formed as part of the singular component.

6. A brake system, comprising:
a wheel hub, comprising:
a hub defining a bore adapted to receive an axle of the vehicle, and
attachment posts extending away from the hub adjacent to the bore,
wherein the attachment posts are singularly and integrally formed with the hub;
a brake disk disposed adjacent the wheel hub; and
a brake caliper, comprising:
a piston housing adapted to hold a piston, the piston housing defining mounting holes used to movably mount the brake caliper directly to the wheel hub at the attachment posts,
a body positioned radially outward of the brake disk,
wherein the piston housing and the body are integrally formed as a singular component, and
an outer support bracket spaced apart from the piston housing on an opposite side of the brake disk from the piston housing,
wherein the outer support bracket includes outer supporting pads positioned at opposite ends of the outer support bracket that support ends of an outer brake pad opposite the body, the outer supporting pads being integrally formed as part of the singular component.

7. The brake system of claim 6, wherein the outer support bracket is integrally formed as part of the singular component, the brake system further comprising:
the outer brake pad held directly by the outer support bracket adjacent to the brake disk; and
an inner brake pad.

8. The brake system of claim 7, wherein the outer support bracket includes a slot with a portion of the outer brake pad received therein to hold the outer brake pad fixed relative to the brake caliper in an axial direction of the piston.

9. The brake system of claim 8, wherein the outer support bracket includes the outer supporting pads positioned at opposite ends of the outer support bracket, the outer supporting pads supporting ends of the outer brake pad opposite the slot, the outer supporting pads being integrally formed as part of the singular component.

10. The brake system of claim 7, wherein the outer supporting pads each comprise an outer ridge protruding towards the body that receive a notch in the outer brake pad, and the outer ridge of each of the outer supporting pads are integrally formed as part of the singular component.

11. The brake system of claim 6, further comprising slider pins movably mounting the brake caliper to the wheel hub via the mounting holes of the piston housing and corresponding holes defined by the attachment posts.

12. The brake system of claim 11, wherein the slider pins guide movement of the brake caliper relative to the wheel hub in an axial direction of the piston of the brake assembly.

13. The brake system of claim 6, wherein the attachment posts each taper from a base adjacent the hub to an end distal to the hub, the end being narrower than the base.

14. The brake system of claim 6, wherein the attachment posts extend orthogonal to an axial direction of the bore.

15. A brake caliper, comprising:
a piston housing adapted to hold a piston, the piston housing defining a mounting hole adapted to movably mount the brake caliper directly to a wheel hub;
an outer support bracket spaced apart from the piston housing and adapted to directly support an outer brake pad on an opposite side of a brake disk of a braking system from the piston housing; and
a body connecting the outer support bracket to the piston housing, the body adapted to be positioned radially outward of the brake disk when the brake caliper is mounted to the wheel hub,
wherein the piston housing, the outer support bracket, and the body are integrally formed as a singular component,
wherein the outer support bracket defines a slot adapted to receive a portion of the outer brake pad to hold the outer brake pad fixed relative to the brake caliper in an axial direction of the piston, and wherein the outer support bracket includes outer supporting pads positioned at opposite ends of the outer support bracket and adapted to support ends of the outer brake pad opposite the slot, the outer supporting pads being integrally formed as part of the singular component.

16. The brake caliper of claim 15, wherein the mounting hole is adapted to receive a slider pin for movably mounting the brake caliper directly to the wheel hub and for guiding movement of the brake caliper, including the outer support bracket, relative to the wheel hub in an axial direction of the piston.

\* \* \* \* \*